(12) United States Patent
Gibson et al.

(10) Patent No.: US 11,118,553 B2
(45) Date of Patent: Sep. 14, 2021

(54) METHODS AND SYSTEM FOR OPERATING A VEHICLE HAVING A DC/DC CONVERTER

(71) Applicant: Ford Global Technologies, LLC, Dearborn, MI (US)

(72) Inventors: Alex O'Connor Gibson, Ann Arbor, MI (US); John Eric Rollinger, Troy, MI (US); David Hancock, Flat Rock, MI (US); David Lew, Canton, MI (US); James M. Basile, Dundee, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/709,678

(22) Filed: Dec. 10, 2019

(65) Prior Publication Data

US 2021/0172415 A1 Jun. 10, 2021

(51) Int. Cl.
*F02N 11/08* (2006.01)
*F02N 11/04* (2006.01)

(52) U.S. Cl.
CPC .......... *F02N 11/0866* (2013.01); *F02N 11/04* (2013.01); *F02N 2011/0888* (2013.01); *F02N 2200/021* (2013.01); *F02N 2200/022* (2013.01); *F02N 2200/023* (2013.01); *F02N 2200/024* (2013.01); *F02N 2200/045* (2013.01)

(58) Field of Classification Search
CPC ................ F02N 11/0866; F02N 11/04; F02N 2200/045; F02N 2200/023; F02N 2011/0888; F02N 2200/024; F02N 2200/021; F02N 2200/022
See application file for complete search history.

(56) References Cited

U.S. PATENT DOCUMENTS

| | | | |
|---|---|---|---|
| 6,425,838 B1 * | 7/2002 | Matsubara | F02B 63/04 475/5 |
| 8,164,206 B2 | 4/2012 | Gibson et al. | |
| 2005/0151509 A1 | 7/2005 | Cook | |
| 2006/0175906 A1 * | 8/2006 | Hino | G09B 23/18 310/1 |
| 2007/0035185 A1 * | 2/2007 | Asao | H02K 11/048 310/58 |
| 2007/0035186 A1 * | 2/2007 | Asao | H02K 11/048 310/58 |
| 2010/0109437 A1 * | 5/2010 | Fattic | B60K 6/48 307/47 |
| 2011/0048822 A1 * | 3/2011 | Kaltenbach | B60W 10/02 180/65.25 |
| 2016/0032880 A1 * | 2/2016 | Lovett | B60K 6/547 701/22 |
| 2018/0258900 A1 * | 9/2018 | Namuduri | F02N 15/067 |
| 2019/0263274 A1 * | 8/2019 | Scolari | B60L 58/12 |

* cited by examiner

*Primary Examiner* — Joseph J Dallo
(74) *Attorney, Agent, or Firm* — Geoffrey Brumbaugh; McCoy Russell LLP

(57) ABSTRACT

A method for operating a vehicle that includes a DC/DC converter is described. In one example, the method includes adjusting an output voltage of the DC/DC converter to increase torque of a belt integrated starter/generator. The output voltage of the DC/DC converter may be adjusted before and during engine cranking.

20 Claims, 6 Drawing Sheets

METHODS AND SYSTEM FOR OPERATING A VEHICLE HAVING A DC/DC CONVERTER

FIELD

The present description relates to methods and a system for operating a vehicle that includes a direct current to direct current (DC/DC) converter. The methods and systems may reduce engine starting time and improve the possibility of engine starting during an engine cranking period.

BACKGROUND AND SUMMARY

A vehicle may include an internal combustion engine that may be started by rotating the engine via an electric machine and supplying fuel to the engine. During many operating conditions, the electric machine may rotate the engine at a speed that facilitates combustion within the engine. However, there may be times when the electric machine's torque output is insufficient to rotate the engine at the speed that facilitates combustion within the engine. For example, if the electric machine is supplied with electric current via a degraded electric energy storage device, then the electric machine may not output torque that is sufficient to rotate the engine at the speed that facilitates combustion within the engine. As a result, the engine may exhibit a long cranking time and/or the engine may not start. Therefore, it may be desirable to improve a possibility of an electric machine having torque capacity to rotate an engine at a desired speed.

The inventors herein have recognized the above-mentioned issues and have developed a vehicle operating method, comprising: adjusting an output voltage of a DC/DC converter that is electrically coupled to a low voltage bus in response to a speed of an engine during engine cranking via a controller; and cranking the engine via an electric machine, the electric machine electrically coupled to the low voltage bus.

By adjusting an output voltage of a DC/DC converter in response to a speed of an engine during engine cranking, it may be possible to provide the technical result of increasing a possibility that an electric machine will have sufficient torque output to rotate an engine at a desired cranking speed. Specifically, an output voltage of a DC/DC converter may be increased if an engine cranking speed is less than a desired engine cranking speed so that torque output of the electric machine may be increased during engine cranking. If the electric machine is cranking the engine at the desired cranking speed without adjusting the output voltage of the DC/DC machine, then the DC/DC machine need not increase a voltage of a low voltage bus that supplies electric power to the electric machine. Thus, the output of the DC/DC converter may boost a voltage of a low voltage bus only when engine cranking speed is less than desired.

The present description may provide several advantages. Specifically, the approach may help to ensure that an engine is cranked at a desired cranking speed. Further, the approach may improve engine starting consistency. In addition, the approach may compensate a voltage that is applied to an electric machine for engine operating conditions and for electric machine operating conditions so that the electric machine may rotate the engine in an expected way.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
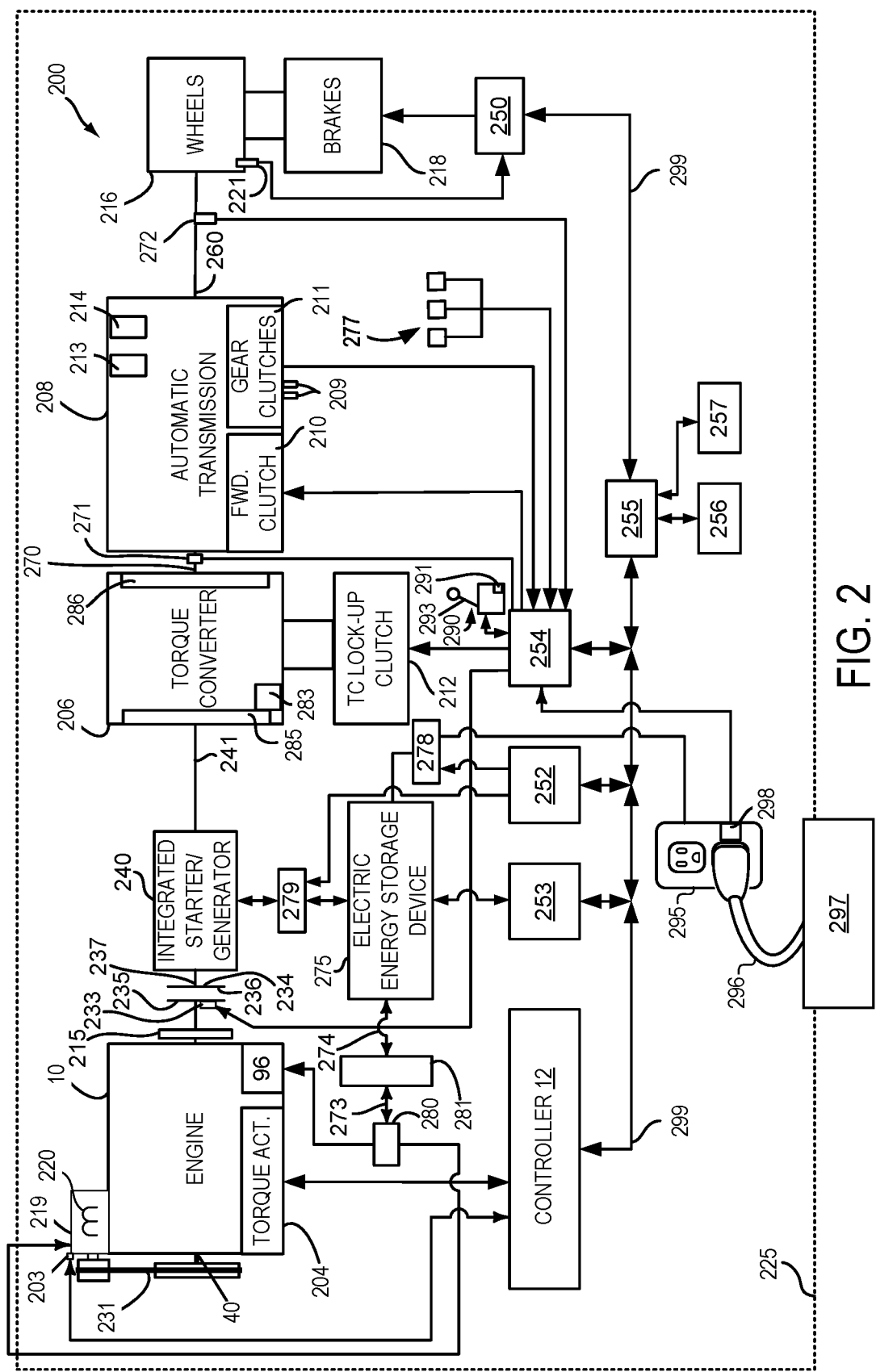
FIG. 2 shows a schematic diagram of an example vehicle driveline or powertrain including the internal combustion engine shown in FIG. 1.
Figure 3:
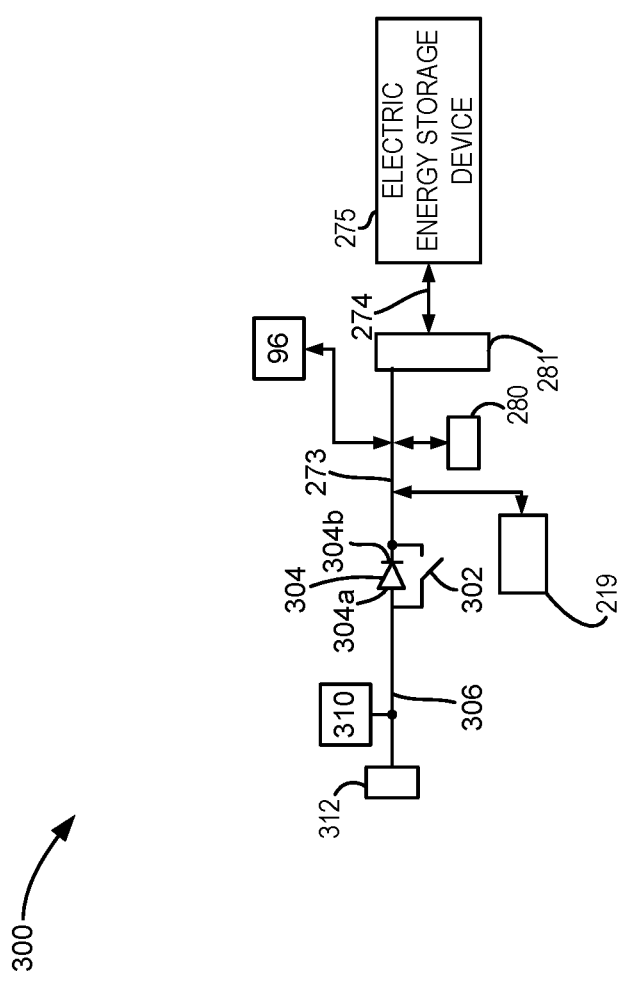
FIG. 3 shows a schematic of an example vehicle electric power system.
Figure 4:
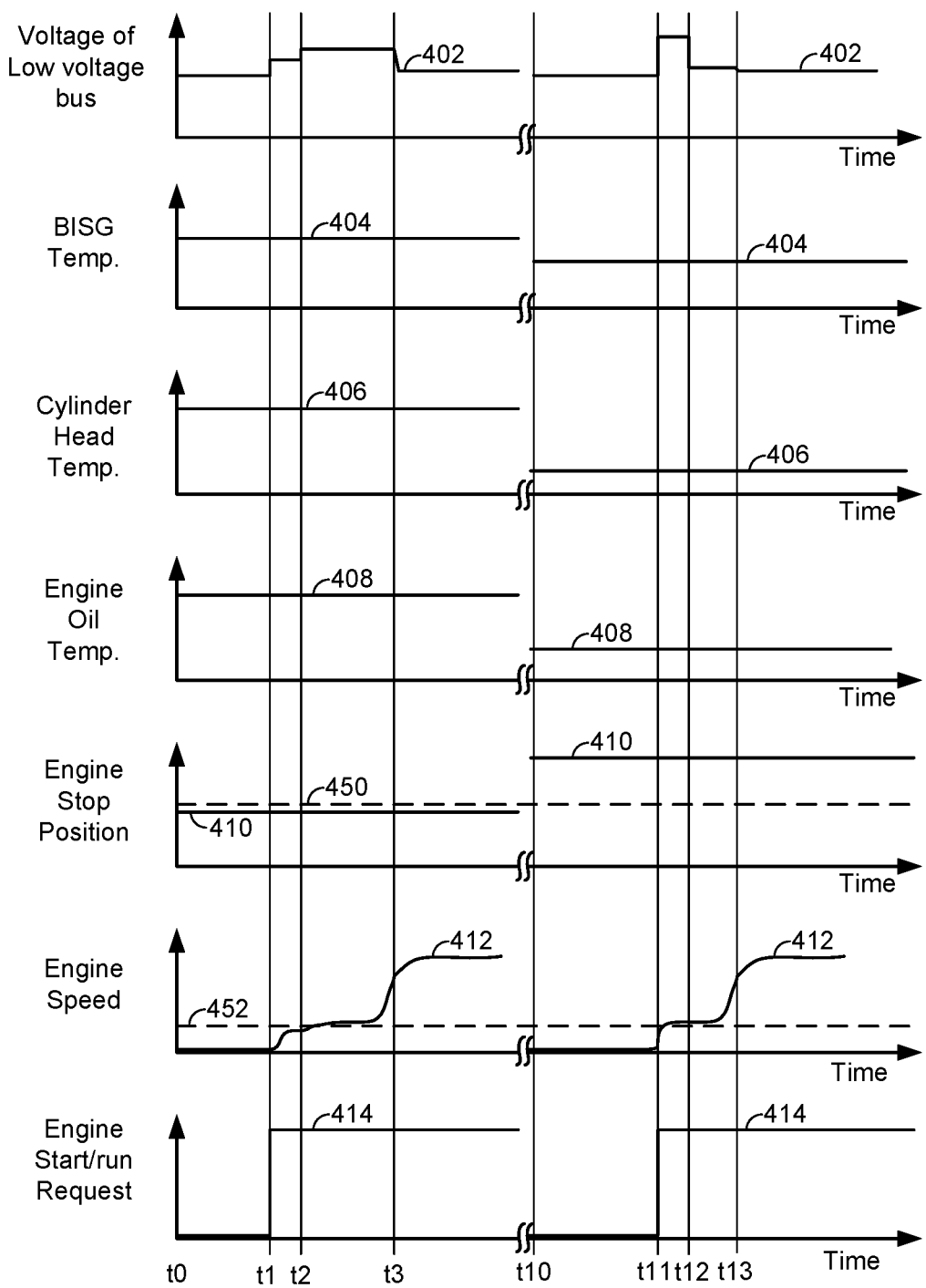
FIG. 4 shows an example vehicle operating sequence according to the method of FIG. 5.

The present description is related to operating a DC/DC converter of a vehicle. The DC/DC converter may be operated in a way that improves engine starting. In particular, a voltage output of the DC/DC converter may be adjusted responsive to vehicle operating conditions so that a torque generating capacity of an electric machine is made more consistent over a variety of vehicle operating conditions. For example, the output voltage of the DC/DC converter may be increased when windings of an electric machine are at a temperature that is above a threshold temperature so that output torque of the electric machine may be sufficient to rotate an engine at a desired speed. By ensuring that the vehicle may be cranked (e.g., rotated via an electric machine under power of the electric machine before combustion in the engine is sufficient to rotate the engine at a predetermined speed) at a uniform speed via an electric machine, it may be possible to make engine starting time more uniform. It may also reduce the possibility of the engine not starting. The engine may be an internal combustion engine of the type shown in FIG. 1, or alternatively, the engine may be a diesel engine. The engine may be integrated into a system that includes a DC/DC converter as shown in FIG. 2. The DC/DC converter may be a component of a vehicle electrical system as shown in FIG. 3. The vehicle system may operate as shown in FIG. 4 according to the method of FIG. 5. Example relationships between boost voltage and vehicle operating conditions are shown in FIG. 6.

Figure 1:
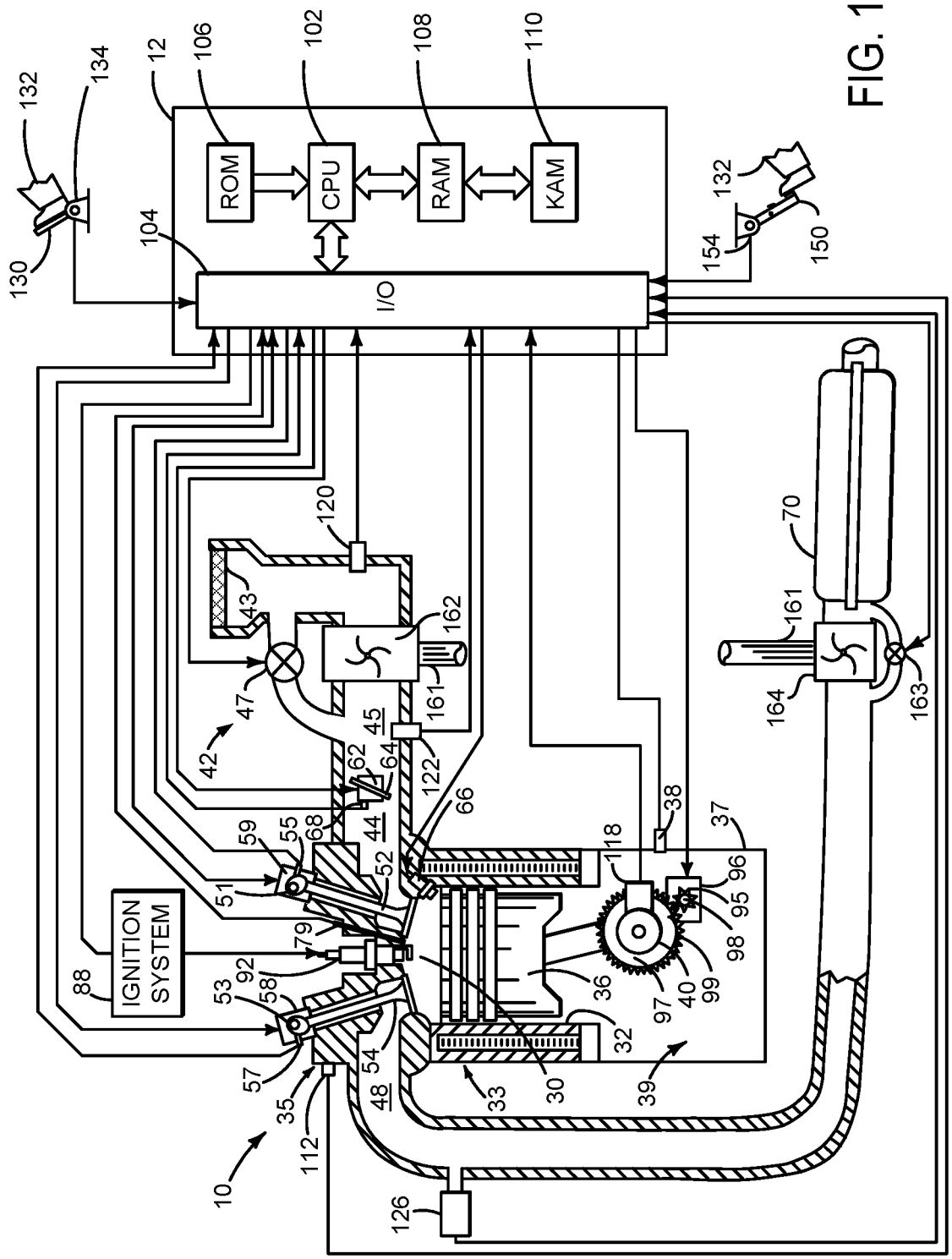
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A phase or position of intake valve 52 may be adjusted relative to a position of crankshaft 40 via valve phase changing device 59. A phase or position of exhaust valve 54 may be adjusted relative to a position of crankshaft 40 via valve phase changing device 58. Valve phase changing devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an accelerator pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; cylinder pressure from pressure sensor 79; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Further, a user may override inhibiting of motion of wheels 216 when external electric power consumer 297 is coupled to vehicle 255. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via belt integrated starter/generator BIS G 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via low voltage bus 273 and/or low voltage battery 280. BISG 219 may operate as a generator supplying electrical power to low voltage battery 280 and/or low voltage bus 273. Bi-directional DC/DC converter 281 may transfer electrical energy from a high voltage bus 274 to a low voltage bus 273 or vice-versa. Low voltage battery 280 is directly coupled to low voltage bus 273. Low voltage bus 273 may be comprised of one or more electrical conductors. Electric energy storage device 275 is electrically coupled to high voltage bus 274. Low voltage battery 280 may selectively supply electrical energy to starter motor 96 and/or BISG 219.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Inverter 278 is shown electrically coupled to electric energy storage device 275 and electrical output receptacle 295. Inverter 278 may convert DC power to AC power for operating external electric power consumer 297 (e.g., hand tools, entertainment systems, lighting, pumps, etc.). Inverter 278 may convert electric power from low voltage battery 280, electric power from electric energy storage device 275, or electric power from ISG 240 or BISG 219 into electric power that is delivered to electrical output receptacle 295. External electric power consumer 297 may be located off-board vehicle 225 or they may be added to vehicle 225. External power consumer 297 may be electrically coupled to electrical output receptacle 295 via power cord 296. External electric power consumer sensor 298 may detect the presence or absence of external power consumer 297. Electric power consumer sensor 298 may physically sense the presence of cord 296 via a switch input, or alternatively, sensor 298 may be a current sensor and detect electric current flow out of electrical output receptacle 295 to determine the presence or absence of external power consumer 297.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Referring now to FIG. 3, an example vehicle electric power system 300 is shown. Vehicle electric power system 300 is included in vehicle 225. Vehicle electric power system 300 includes a buffered low voltage bus 306, a low voltage bus 273, and a high voltage bus 274 for distributing power throughout the vehicle power system 300. The buffered low voltage bus 306, the low voltage bus 273, and the high voltage bus 274 may be comprised of separate electrical conductors. Buffered low voltage bus 306 may be buffered from low voltage bus 273 via diode 304 and electric isolation switch 302. The diode 304 is biased such that anode 304a of diode 304 is directly coupled to the buffered low voltage bus 306 and the cathode side 304b of diode 304 is directly coupled to the low voltage bus 273. The DC/DC converter 281 buffers the low voltage bus 273 from high voltage bus 274. BISG 219, starter 96, DC/DC converter 281, diode 304, isolation switch 302, and low voltage battery 280 are all directly coupled to low voltage bus 273. Electric energy storage device 275, DC/DC converter 281, and some devices shown in FIG. 2 are directly coupled to high voltage bus 274. Auxiliary electric energy storage device 310 (e.g., battery) and auxiliary loads 312 (e.g., entertainment systems, electric steering systems, air conditioning and heating systems, etc.) are directly coupled to buffered low voltage bus 306.

Diode 304 prevents current flow to auxiliary electric energy storage device 310 (e.g., battery) and auxiliary electric loads 312 when voltage of low voltage bus 273 is being boosted via DC/DC converter while isolation switch 302 is in an open state. This may be beneficial because current and voltage that is supplied to the low voltage bus 273 via the DC/DC converter is not consumed via auxiliary battery when isolation switch 302 is in an open state during engine cranking. As a result, all of the electric power that is delivered via the DC/DC converter from the high voltage bus to the low voltage bus may be made available to the BISG during engine cranking. Once engine cranking is complete, the isolation switch 302 may be closed so that the BISG may charge auxiliary electric energy storage device 310 after the engine speed has exceeded a threshold engine speed.

The auxiliary loads 312 and the auxiliary electric energy storage device 310 are coupled to the buffered low voltage bus so that the auxiliary electric loads 312 may be powered solely via the auxiliary electric energy storage device 310 during engine cranking. Consequently, the auxiliary electric loads do not consume electric power from the DC/DC converter 281 during engine cranking. As such, the voltage that is applied to BISG 219 may be greater than if auxiliary electric loads 312 were also powered via DC/DC converter 281 during engine cranking. Accordingly, torque output of BISG 219 may have a better possibility of reaching a desired level since the voltage input to the BISG 219 may be increased during engine cranking, if requested. The engine may be cranked at a desired speed when the voltage that is applied to BISG 219 reaches a desired level.

Thus, the system of FIGS. 1 and 2 provides for a vehicle electric power system, comprising: a high voltage electric energy storage device electrically coupled to a high voltage bus; a low voltage electric energy storage device electrically coupled to a low voltage bus; a DC/DC converter electrically coupled to the high voltage bus and the low voltage bus; a second low voltage electric energy storage device selectively coupled to the low voltage bus via an isolation switch and buffered from the low voltage bus via a diode; and a controller including executable instructions stored in non-transitory memory that cause the controller to adjust an output voltage of the DC/DC converter in response to an engine stop position. The vehicle electric power system further comprises additional executable instructions to increase the output voltage of the DC/DC converter in response to a stopping position of a piston of a cylinder being within a threshold crankshaft angle of top-dead-center compression stroke of the cylinder. The vehicle system includes where the output voltage of the DC/DC converter is applied to the low voltage bus. The vehicle system includes where the output voltage is adjusted when the engine is stopped. The vehicle system includes where the output voltage is adjusted during engine cranking. The vehicle system further comprises additional instructions to crank the engine via a BISG and electric power provided via the low voltage bus. The vehicle system further comprises additional instructions to adjust the output voltage of the DC/DC converter in response to a temperature of the BISG.

Figure 5:
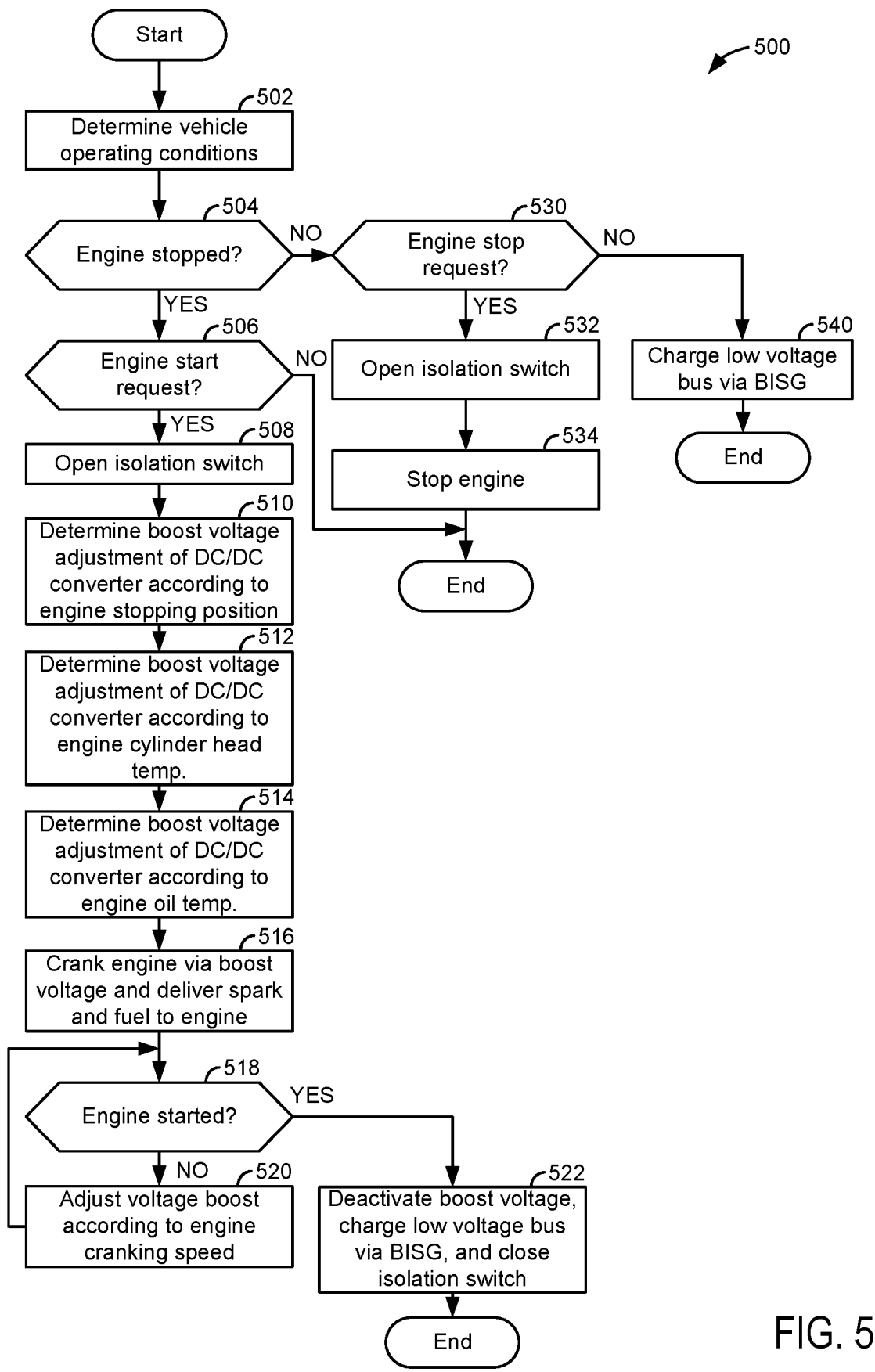
FIG. 5 shows a flowchart of a method for operating a DC/DC converter and a vehicle.
Figure 6:
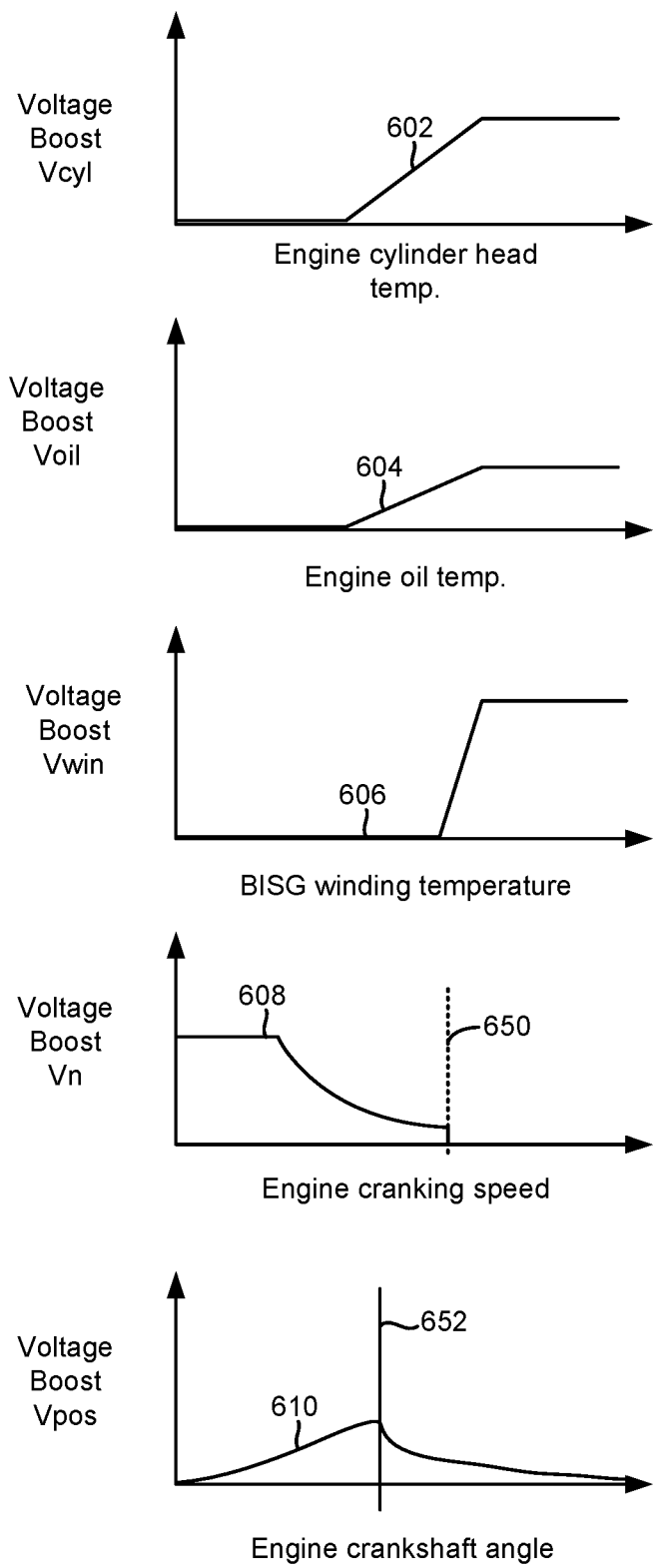
FIG. 6 shows example functions that form a basis for adjusting a voltage supplied to a low voltage bus via a DC/DC converter.

Referring now to FIG. 4, a vehicle operating sequence according to the method of FIG. 5 is shown. The vehicle operating sequence of FIG. 4 may be provided via the system of FIGS. 1-3 in cooperation with the method of FIG. 5. The plots shown in FIG. 4 are time aligned and occur at the same time. The vertical lines represent times of interest during the sequence. The SS marks along the horizontal axis represent breaks in time and the breaks may be short or long in duration.

The first plot from the top of FIG. 4 is a plot of voltage of a low voltage bus (e.g., 274) versus time. The vertical axis represents the voltage of the low voltage bus and the voltage increases in the direction of the vertical axis arrow. The horizontal axis represents time and time increases from the left side of the figure to the right side of the figure. Trace 402 represents the voltage of the low voltage bus.

The second plot from the top of FIG. 4 is a plot of BISG winding temperature versus time. The vertical axis represents the BISG winding temperature and the BISG winding temperature increases in the direction of the vertical axis arrow. The horizontal axis represents time and time increases from the left side of the figure to the right side of the figure. Trace 404 represents the BISG winding temperature.

The third plot from the top of FIG. 4 is a plot of engine cylinder head temperature versus time. The vertical axis represents the engine cylinder head temperature and the cylinder head temperature increases in the direction of the vertical axis arrow. The horizontal axis represents time and time increases from the left side of the figure to the right side of the figure. Trace 406 represents the cylinder head temperature.

The fourth plot from the top of FIG. 4 is a plot of engine oil temperature versus time. The vertical axis represents the engine oil temperature and the engine oil temperature increases in the direction of the vertical axis arrow. The horizontal axis represents time and time increases from the left side of the figure to the right side of the figure. Trace 408 represents engine oil temperature.

The fifth plot from the top of FIG. 4 is a plot of a most recent engine stopping position versus time. The vertical axis represents the most recent engine stopping position. The horizontal axis represents time and time increases from the left side of the figure to the right side of the figure. Line 410 represents the engine stopping position. Line 450 represents a desired engine stopping position. If the engine is stopped at a position that is indicated below line 450, then the engine may be stopped at such a position that torque to crank the engine is less than a threshold torque. If the engine is stopped at a position that is indicated above line 450, then the engine may be stopped at such a position that torque to crank the engine is greater than a threshold.

For example, the engine may be stopped at a position where pressure in one or more engine cylinders is low (e.g., below line 450) so that the engine may rotate for a distance before pressure in the cylinders increases so that the torque to initially crank the engine is lower due to overcoming a lower cylinder pressure while overcoming friction to begin crankshaft rotation. During such conditions, the engine may be rotated to a requested or desired cranking speed using a lower torque generated via the BISG. On the other hand, the engine may be stopped at a position where pressure in one or more engine cylinders is higher (e.g., above line 450) before and during initial engine rotation so that it may take a greater amount of torque to rotate the engine to the requested cranking speed. Thus, the engine's stopped position may be indicative of an amount of torque required to rotate the engine to a requested cranking speed. As such, this realization may be the basis for adjusting a boost voltage so that BISG output torque may be sufficient to rotate the engine at the requested engine cranking speed.

The sixth plot from the top of FIG. 4 is a plot of engine speed versus time. The vertical axis represents the engine speed and engine speed increases in the direction of the vertical axis arrow. The horizontal axis represents time and time increases from the left side of the figure to the right side of the figure. Trace 412 represents engine speed. Horizontal line 452 represents a requested engine cranking speed (e.g., 250 RPM).

The seventh plot from the top of FIG. 4 is a plot of an engine start/run request versus time. The vertical axis represents the state of the engine start/run request and the engine start request is asserted when trace 414 is at a higher level near the vertical axis arrow. The engine start/run request is not asserted when trace 414 is at a lower level near the horizontal axis. The engine may be attempted to start and/or the engine may be running when the engine start/run request is asserted. The engine is stopped or commanded to stop when the engine start/run request is not asserted. The horizontal axis represents time and time increases from the left side of the figure to the right side of the figure. Trace 414 represents the engine start/run request state.

At time t0, the engine is off (e.g., not combusting fuel and not rotating) and the engine start request is not asserted. The voltage of the low voltage bus is at a nominal voltage of the low voltage bus battery (e.g., 12 VDC). The temperature of the BISG windings is a higher middle level and the cylinder head temperature is a higher middle level. In addition, the engine oil temperature is a higher middle level. Further, since the BISG windings are at a higher temperature, it may be necessary to apply a greater voltage to the BISG so that torque output of the BISG is an expected amount. The engine stopping position is near a desired engine stopping position. Therefore, additional torque is not expected to be needed to crank the engine at a desired cranking speed due to the most recent engine stopping position.

At time t1, a request to start the engine is indicated. The engine start request may be generated via a human or autonomous driver. The DC/DC converter is commanded to boost the voltage of the low voltage bus before the engine is rotated, or alternatively, while the engine is rotating so that the BISG may have sufficient torque to rotate the engine at the requested engine cranking speed (e.g., 250 RPM). The voltage that is output via the DC/DC converter is a function of and based on BISG winding temperature, engine oil temperature, and cylinder head temperature. The voltage output from the DC/DC converter is greater than a voltage of the low voltage battery that is directly coupled to the low voltage bus so that the DC/DC converter may boost the voltage of the low voltage bus. The voltage boost that is provided via the DC/DC converter is expected to be sufficient to allow the torque that is output from the BISG to rotate the engine at the requested engine cranking speed. The engine speed begins to increase shortly after time t1 as the BISG (not shown) begins to rotate the engine. In addition, the isolation switch (e.g., 302 of FIG. 3 is opened in response to the engine start/run request being asserted.

Between time t1 and time t2, the engine speed increases as the BISG rotates the engine (not shown). The BISG winding temperature, engine cylinder head temperature, and engine oil temperature are unchanged. The engine stop position is unchanged since the engine stopping position is not updated until the engine stops. The engine start/run request remains asserted.

At time t2, the engine speed has not achieved the requested engine speed so the voltage of the low voltage bus is boosted further via increasing the voltage that is output via the DC/DC converter to the low voltage bus. The voltage that is output via the DC/DC is increased in response to engine speed. The engine start request remains asserted and the engine stop position remains unchanged. The BISG winding temperature, engine cylinder head temperature, and engine oil temperature are unchanged.

Between time t2 and time t3, the engine speed is increased to the threshold speed 452 via the increase in voltage that is output via the DC/DC converter. In addition, combustion begins in the engine and the engine begins to accelerate due to the combustion shortly before time t3. The engine start/ run request remains asserted and the voltage of the low voltage bus is unchanged since it was last increased at time t2.

At time t3, the engine has accelerated to a threshold speed (e.g., engine idle speed) and the voltage output from the DC/DC converter is reduced in response thereto. In addition, the isolation switch 302 may be closed at this time (not shown). The engine start request remains asserted and the engine stop position remains unchanged. The BISG winding temperature, engine cylinder head temperature, and engine oil temperature are unchanged. A break in the sequence is indicated between time t3 and time t10.

At time t10, the engine is off (e.g., not combusting fuel and not rotating) and the engine start request is not asserted. The voltage of the low voltage bus is at a nominal voltage of the low voltage bus battery (e.g., 12 VDC). The temperature of the BISG windings is a lower middle level and the cylinder head temperature is a lower level. In addition, the engine oil temperature is a lower level. Since the cylinder head and engine oil temperatures are lower, a reduced amount of torque may be necessary to rotate the engine at a requested engine cranking speed. In addition, since the BISG windings are at a lower temperature, it is not necessary to apply a greater voltage to the BISG so that torque output of the BISG is an expected amount. The engine stopping position is not near a desired engine stopping position so it is expected that a greater amount of torque may be necessary to initially rotate the engine to the requested engine cranking speed.

At time t11, a request to start the engine is indicated. The DC/DC converter is commanded to boost the voltage of the low voltage bus before the engine is rotated, or alternatively, while the engine is rotating so that the BISG may initially have sufficient torque to rotate the engine at the requested engine cranking speed (e.g., 250 RPM). The voltage that is output via the DC/DC converter is a function of the most recent engine stopping position or crankshaft angle. The voltage output from the DC/DC converter is greater than a voltage of the low voltage battery that is directly coupled to the low voltage bus so that the DC/DC converter may boost the voltage of the low voltage bus. The voltage boost that is provided via the DC/DC converter is expected to be sufficient to allow the torque that is output from the BISG to rotate the engine at the requested engine cranking speed. The engine speed begins to increase shortly after time t11 as the BISG (not shown) begins to rotate the engine. In addition, the isolation switch (e.g., 302 of FIG. 3) is opened in response to the engine start/run request being asserted.

Between time t11 and time t12, the engine speed increases as the BISG rotates the engine (not shown). The BISG winding temperature, engine cylinder head temperature, and engine oil temperature are unchanged. The engine stop position is unchanged since the engine stopping position is not updated until the engine stops. The engine start/run request remains asserted.

At time t12, the engine speed has achieved the requested engine speed so the voltage of the low voltage bus is boosted less via decreasing the voltage that is output via the DC/DC converter to the low voltage bus. The voltage that is output via the DC/DC is decreased in response to engine speed. The engine start request remains asserted and the engine stop position remains unchanged. The BISG winding temperature, engine cylinder head temperature, and engine oil temperature are unchanged.

Between time t12 and time t13, the engine rotates at the requested cranking speed 452. In addition, combustion begins in the engine and the engine begins to accelerate due to the combustion shortly before time t13. The engine start/run request remains asserted and the voltage of the low voltage bus is unchanged since it was last decreased at time t12.

At time t13, the engine has accelerated to a threshold speed (e.g., engine idle speed) and the voltage output from the DC/DC converter is reduced in response thereto. In addition, the isolation switch 302 may be closed at this time (not shown). The engine start request remains asserted and the engine stop position remains unchanged. The BISG winding temperature, engine cylinder head temperature, and engine oil temperature are unchanged.

In this way, an output voltage of a DC/DC converter may be adjusted to adjust torque output of an electric machine so that engine starting timing may be improved. The DC/DC converter output voltage to the low voltage bus may be increased or decreased based on engine speed. Further, the output voltage of the DC/DC converter may be adjusted according to an engine stopping position such that when torque to turn the engine is expected to be higher, output voltage of the DC/DC converter may be increased. When torque to turn the engine is expected to be lower, output voltage of the DC/DC converter may be decreased to conserve energy.

Referring now to FIG. 5, a method for operating a vehicle is shown. At least portions of method 500 may be implemented as executable controller instructions stored in non-transitory memory. Method 500 may operate in cooperation with the system of FIGS. 1-3. Additionally, portions of method 500 may be actions taken in the physical world to transform an operating state of an actuator or device. The method of FIG. 5 may be incorporated into the system of FIGS. 1-3 as executable instructions stored in non-transitory memory.

At 502, method 500 determines vehicle operating conditions. Vehicle operating conditions may include but are not limited to engine speed, BISG winding temperature, engine oil temperature, engine cylinder head temperature, engine stop position, and voltage of the low voltage bus. The vehicle operating conditions may be determined via the sensors and actuators that are described herein. Method 500 proceeds to 504.

At 504, method 500 judges if the engine is stopped. Method 500 may judge that the engine is stopped if the engine is not rotating. If method 500 judges that the engine is stopped, the answer is yes and method 500 proceeds to 506. Otherwise, the answer is no and method 500 proceeds to 530.

At 506, method 500 judges if there is an engine start request. Method 500 may judge that there is an engine start request if a human, controller, or autonomous driver is requesting that an engine be started. The engine start request may be input to a human/machine interface or it may be generated via a controller responsive to vehicle operating conditions (e.g., accelerator pedal position and brake pedal position). If method 500 judges that the engine start is requested, the answer is yes and method 500 proceeds to 508. Otherwise, the answer is no and method 500 proceeds to exit.

At 508, method 500 opens the isolation switch (e.g., 302 of FIG. 3). The isolation switch may be opened so that charge from the DC/DC converter is not delivered to an auxiliary battery and auxiliary electrical loads. Consequently, a greater amount of the DC/DC converter's electric output may be reserved for an electric machine to crank the engine (e.g., a BISG or an engine starter). Method 500 proceeds to 510.

At 510, method 500 adjusts a boost voltage of the DC/DC converter according to an engine stopping position. In one example, method 500 adjusts a voltage boost amount provided via the DC/DC converter to the low voltage bus as a function of the position or crankshaft angle at which the engine most recently stopped. For example, as shown in FIG. 6, the output of the DC/DC converter may be adjusted in response to a crankshaft angle at which the engine most recently stopped. The engine's crankshaft angle may be measured relative to top-dead-center compression stroke of cylinder number one and the crankshaft angle may have a range of 0-719 degrees for a four stroke engine.

The value of the engine position based boost voltage adder (Vpos) may increase and decrease as a function of the crankshaft angle at which the engine stops. For example, if the engine is a single cylinder engine and the engine stops near top-dead-center compression stroke of the cylinder, the expected cranking torque to begin engine rotation may be higher since the cylinder is compressing an air charge. However, if the engine is stopped after top-dead-center compression stroke and during an expansion stroke, then the expected cranking torque may be lower since the cylinder is expanding, depending on the amount of time the engine has not rotated. FIG. 6 shows one example of DC/DC voltage boost as a function of a most recent engine stopping position or crankshaft angle. Method 500 determines the engine stopping position based boost voltage adjustment via indexing or referencing a table or function and proceeds to 512.

At 512, method 500 adjusts a boost voltage of the DC/DC converter according to an engine cylinder head temperature. Specifically, method 500 adjusts a boost amount provided via the DC/DC converter to the low voltage bus as a function of the present engine cylinder head temperature. Engine cylinder head temperature may be indicative of an amount of torque that is required to rotate an engine. For some engines, higher cylinder head temperatures may indicate that a greater amount of torque may be needed to rotate the engine at a requested engine cranking speed. Lower cylinder head temperatures may indicate that a smaller amount of torque may be needed to rotate the engine at the requested engine cranking speed. FIG. 6 shows one example of DC/DC voltage boost as a function of engine cylinder head temperature. Method 500 determines the boost voltage Vcyl for the present engine cylinder head temperature via referencing a table or function stored in memory and proceeds to 514.

At 514, method 500 adjusts a boost voltage of the DC/DC converter according to an engine oil temperature and an electric machine winding temperature. In particular, method 500 adjusts a boost amount provided via the DC/DC converter to the low voltage bus as a function of the present engine oil temperature and electric machine winding temperature. Engine oil temperature may be indicative of an amount of torque that is required to rotate an engine. For some engines, higher engine oil temperatures may indicate that a greater amount of torque may be needed to rotate the engine at a requested engine cranking speed. Lower engine oil temperatures may indicate that a smaller amount of torque may be needed to rotate the engine at the requested engine cranking speed. FIG. 6 shows one example of DC/DC voltage boost as a function of engine oil temperature. Method 500 referenced or indexes a table or function stored in memory to determine the boost voltage Voil for the present engine oil temperature.

Higher electric machine winding temperatures may be indicative of high winding resistance and higher winding resistance may lead to lower current flow through the electric machine. Lower current flow through the electric machine may reduce electric machine torque output, thereby reducing engine cranking speed. Method 500 determines the boost voltage Vwin for the present electric machine winding temperature and proceeds to 516.

At 516, method 500 sums all the boost voltages and outputs the boost voltage via the DC/DC converter to the low voltage bus to raise the voltage of the low voltage bus. In one example, the DC/DC converter boost voltage is comprised of a base voltage (e.g., 12 VDC) and a plurality of adder voltages that may be expressed as:

$$V_{boost} = V_{base} + V_{pos} + V_{cyl} + V_{oil} + V_{win} + V_n$$

where Vboost is a variable representing the final boost voltage that is output from the DC/DC converter to the low voltage bus, Vbase is a variable that represents a base boost voltage (e.g., 12 VDC), Vpos is a variable that represents an engine position based boost voltage adder, Vcyl is a variable that represents an engine cylinder temperature based boost voltage adder, Voil is a variable that represents an engine oil temperature based boost voltage adder, Vwin is a variable that represents an electric machine winding temperature based boost voltage adder, and Vn is a variable that represents an engine speed based boost voltage adder.

If all the boost voltage adder values other than Vbase add up to zero, the DC/DC converter may not output a boost voltage. The boost voltage may be output to the low voltage bus before the engine is rotated and while the engine is stopped so that the BISG or starter is exposed to the boost voltage for the early portion of the engine cranking sequence. As such, torque output via the BISG or starter may be uniform during the engine cranking sequence so that engine speed variation during engine cranking may be minimized, thereby improving customer satisfaction. Alternatively, method 500 may output the boost voltage at the same time engine cranking begins, or shortly thereafter, to avoid the possibility of delaying engine cranking. Some customers may prefer a quick response to an engine start request and simultaneously cranking the engine and boosting voltage of the low voltage bus may increase their product satisfaction. Method 500 attempts to rotate the engine at a requested engine cranking speed via applying the boost voltage to the low voltage bus and rotating the engine via an electric machine that is powered from the low voltage bus. Method 500 also supplies spark and fuel to the engine to start the engine. Method 500 proceeds to 518.

At 518, method 500 judges if the engine is started. In one example, method 500 may judge that the engine is started when a speed of the engine reaches engine idle speed (e.g., 600 RPM). If method 500 judges that the engine has started, the answer is yes and method 500 proceeds to 522. In addition, method 522 may proceed to 522 if the engine has been cranked for a threshold amount of time without the engine starting. If method 500 judges that the engine is not started, the answer is no and method 500 proceeds to 520.

At 520, method 500 adjusts a boost voltage of the DC/DC converter according to an engine speed. Method 500 adjusts a boost amount provided via the DC/DC converter to the low voltage bus as a function of the present engine speed while the engine is being cranked via the BISG or starter. If the engine speed is less than the requested engine cranking speed, it may be indicative that the BISG or starter is outputting a torque that is lower than may be expected. Accordingly, if engine speed is less than a requested engine cranking speed, the boost voltage of the DC/DC converter may be increased to increase engine cranking speed. In addition, method 500 may adjust boost voltage functions as shown in FIG. 6 that may be stored in controller memory if engine speed is less than a requested engine cranking speed after boost voltage has been applied to the low voltage bus. In this way, the functions shown in FIG. 6 may be adapted to improve engine cranking. Further, once the engine reaches the requested engine cranking speed, the DC/DC converter voltage boost Vpos may be reduced to zero to conserve energy. Method 500 returns to 518.

At 522, method 500 deactivates the boost voltage from the DC/DC converter (e.g., reduces the boost voltage to zero) and supplies charge to the low voltage bus via the BISG. In other words, the BISG switches from operating as a motor to operating as a generator. Method 500 also closes the isolation switch so that the auxiliary electric energy storage device may be charged via the BISG. Method 500 proceeds to exit.

At 530, method 500 judges if an engine stop has been requested. An engine stop may be requested via a human, a controller, or via an autonomous driver. If method 500 judges that an engine stop has been requested, the answer is yes and method 500 proceeds to 532. Otherwise, the answer is no and method 500 proceeds to 540.

At 532, method 500 opens the isolation switch so that an auxiliary battery and auxiliary electrical loads may not receive charge from the BISG during a next engine start sequence. Method 500 proceeds to 534.

At 534, method 500 stops engine rotation by ceasing fuel and spark delivery to the engine. Method 500 proceeds to exit.

At 540, method 500 supplies electric charge to the low voltage bus via the BISG to power electric devices that are electrically coupled to the low voltage bus and to charge electric energy storage devices that are electrically coupled to the low voltage bus. Method 500 proceeds to exit.

Thus, the method of FIG. 5 provides for a vehicle operating method, comprising: adjusting an output voltage of a DC/DC converter directly coupled to a low voltage bus in response to a speed of an engine during engine cranking via a controller; and cranking the engine via an electric machine, the electric machine directly coupled to the low voltage bus. The method includes where the DC/DC converter supplies electric charge from a high voltage bus to the low voltage bus. The method further comprises reducing the output voltage of the DC/DC converter in response to engine speed being greater than a threshold speed. The method further comprises closing an isolation switch coupled to the low voltage bus in response to the engine speed being greater than the threshold speed. The method further comprises adjusting the output voltage of the DC/DC converter in response to an engine temperature while the engine is stopped. The method includes where the engine temperature is a cylinder head temperature. The method includes where the engine temperature is an engine oil temperature.

The method of FIG. 5 also provides for a vehicle operating method, comprising: adjusting an output voltage of a DC/DC converter directly coupled to a low voltage bus in response to a temperature of an engine while an engine is not rotating via a controller; and cranking the engine after adjusting the output voltage of the DC/DC converter via an electric machine, the electric machine directly coupled to the low voltage bus. The method includes where adjusting the output voltage includes adjusting the output voltage to a first voltage in response to the temperature of the engine being greater than a threshold temperature and adjusting the output voltage to a second voltage in response to the temperature being less than the threshold temperature, first voltage greater than the second voltage. The method further comprises adjusting the output voltage of the DC/DC converter in response to the temperature of the engine while the engine is rotating. The method includes where the temperature is an engine oil temperature. The method includes where the temperature is a cylinder head temperature. The method further comprises ceasing to adjust output of the DC/DC converter in response to the temperature of the engine when engine speed is greater than a threshold speed.

Referring now to FIG. 6, five plots are shown. The five plots represent example relationships or transfer functions that may be stored in controller read-only memory or in controller random access memory. The functions shown in FIG. 6 are provided to simply show the relationships between variables and are not intended to limit the scope of this disclosure. In addition, the relationships shown in FIG. 6 may be different for different engines and BISGs.

The first plot from the top of FIG. 6 is a plot of a DC/DC converter voltage boost adder function that returns a value of Vcyl when the function is referenced via engine cylinder head temperature. The vertical axis represents the variable Vcyl and the value of Vcyl increases in the direction of the vertical axis arrow. The horizontal axis represents engine cylinder head temperature and cylinder head temperature increases in the direction of the horizontal axis arrow. Line 602 represents a relationship between a DC/DC voltage boost adder Vcyl and engine cylinder head temperature. In this example, the value of Vcyl increases as cylinder head temperature increases and then Vcyl levels off at higher cylinder head temperatures. Thus, for this example, the voltage boost adder is increased at higher cylinder head temperatures so that BISG torque output may be increased for higher cylinder head temperatures. Torque to crank the engine when the engine's cylinder head temperature is higher may increase. Thus, relationship 602 provides a boost voltage increase that may improve the possibility of engine cranking speed matching a requested engine cranking speed, even when engine cylinder head temperature varies. The relationship 602 may be determined via stopping an engine with different engine cylinder head temperatures and adjusting DC/DC converter output voltage for the different cylinder head temperatures and recording DC/DC converter output voltages that cause the BISG to rotate the engine at a requested engine cranking speed.

The second plot from the top of FIG. 6 is a plot of a DC/DC converter voltage boost adder function that returns a value of Voil when the function is referenced via engine oil temperature. The vertical axis represents the variable Voil and the value of Voil increases in the direction of the vertical axis arrow. The horizontal axis represents engine oil temperature and engine oil temperature increases in the direction of the horizontal axis arrow. Line 604 represents a relationship between a DC/DC voltage boost adder Voil and engine oil temperature. In this example, the value of Voil increases as engine oil temperature increases and then Voil levels off at higher engine oil temperatures. Consequently, for this example, the voltage boost adder is increased at higher engine oil temperatures so that BISG torque output may be increased for higher engine oil temperatures. Torque to crank the engine when the engine's oil temperature is higher may increase. Thus, relationship 604 provides a boost voltage increase that may improve the possibility of engine cranking speed matching a requested engine cranking speed, even when engine oil temperature varies. The relationship 604 may be determined via stopping an engine with different engine oil temperatures and adjusting DC/DC converter output voltage for the different oil temperatures and recording DC/DC converter output voltages that cause the BISG to rotate the engine at a requested engine cranking speed.

The third plot from the top of FIG. 6 is a plot of a DC/DC converter voltage boost adder function that returns a value of Vwin when the function is referenced via BISG winding temperature. The vertical axis represents the variable Vwin and the value of Vwin increases in the direction of the vertical axis arrow. The horizontal axis represents BISG winding temperature and BISG winding temperature increases in the direction of the horizontal axis arrow. Line 606 represents a relationship between a DC/DC voltage boost adder Vwin and BISG winding temperature. In this example, the value of Vwin increases as BISG winding temperature increases and then Vwin levels off at higher BISG winding temperatures. Thus, for this example, the voltage boost adder is increased at higher BISG winding temperatures so that BISG torque output may be increased for higher BISG winding temperatures. Torque to crank the engine when the BISG's winding temperature is higher may increase. Thus, relationship 606 provides a boost voltage increase that may improve the possibility of engine cranking speed matching a requested engine cranking speed, even when BISG winding temperature varies. The relationship 606 may be determined via stopping an engine with different BISG winding temperatures and adjusting DC/DC converter output voltage for the different BISG winding temperatures and recording DC/DC converter output voltages that cause the BISG to rotate the engine at a requested engine cranking speed.

The fourth plot from the top of FIG. 6 is a plot of a DC/DC converter voltage boost adder function that returns a value of Vn when the function is referenced via engine speed. The vertical axis represents the variable Vn and the value of Vn increases in the direction of the vertical axis arrow. The horizontal axis represents engine speed and engine speed increases in the direction of the horizontal axis arrow. Line 608 represents a relationship between a DC/DC voltage boost adder Vn and engine speed. In this example, the value of Vn decreases as engine speed increases toward a requested engine cranking speed. The requested engine cranking speed is indicated via vertical line 650. The value of Vn is reduced to zero when engine cranking speed is equal to the requested engine cranking speed. Accordingly, for this example, the voltage boost adder is greater at lower engine cranking speeds and lower when engine cranking speed is equal to the requested engine cranking speed. Thus, relationship 608 provides a boost voltage increase that may improve the possibility of engine cranking speed matching a requested engine cranking speed, even when engine cranking speed varies. The relationship 608 may be determined via rotating the engine via the BISG with different voltage input levels to the BISG and adjusting DC/DC converter output voltage until the engine rotates at the requested cranking speed. Optionally, a proportional/integral controller may adjust DC/DC converter output voltage as a function of an engine speed error between a requested engine cranking speed and actual engine cranking speed.

The fifth plot from the top of FIG. 6 is a plot of a DC/DC converter voltage boost adder function that returns a value of Vpos when the function is referenced via a most recent engine stopping position (e.g., crankshaft angle). The vertical axis represents the variable Vpos and the value of Vpos increases in the direction of the vertical axis arrow. The horizontal axis represents the most recent engine stopping position and engine stopping position is shown relative to top-dead-center compression stroke of an engine cylinder; however, engine stopping position may be referenced to other engine positions if desired. Line 610 represents a relationship between a DC/DC voltage boost adder Vpos and a most recent engine stopping position. In this example, the value of Vpos increases as engine stopping position approaches top-dead-center compression stroke of the reference cylinder (e.g., cylinder number one) and Vpos decreases as engine stopping position is after top-dead-center compression stroke of the reference cylinder. Vertical line 652 represents top-dead-center compression stroke for the reference cylinder. Thus, for this example, the voltage boost adder is increased as engine stopping position approaches top-dead-center compression stroke of the reference cylinder so that BISG torque output may be increased when higher pressures in the engine cylinders may be expected. Thus, relationship 610 provides a boost voltage increase that may improve the possibility of engine cranking speed matching a requested engine cranking speed, even when a most recent engine stopping position varies. The relationship 610 may be determined via stopping an engine at different engine crankshaft angles and adjusting DC/DC converter output voltage for the different engine crankshaft angles and recording DC/DC converter output voltages that cause the BISG to rotate the engine at a requested engine cranking speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
adjusting an output voltage of a DC/DC converter directly coupled to a low voltage bus in response to a speed of an engine during engine cranking via a controller; and
cranking the engine via an electric machine, the electric machine directly coupled to the low voltage bus.

2. The method of claim 1, where the DC/DC converter supplies electric charge from a high voltage bus to the low voltage bus.

3. The method of claim 1, further comprising reducing the output voltage of the DC/DC converter in response to engine speed being greater than a threshold speed.

4. The method of claim 3, further comprising closing an isolation switch coupled to the low voltage bus in response to the engine speed being greater than the threshold speed.

5. The method of claim 1, further comprising adjusting the output voltage of the DC/DC converter in response to an engine temperature while the engine is stopped.

6. The method of claim 5, where the engine temperature is a cylinder head temperature.

7. The method of claim 5, where the engine temperature is an engine oil temperature.

8. A vehicle electric power system, comprising:
a high voltage electric energy storage device electrically coupled to a high voltage bus;
a low voltage electric energy storage device electrically coupled to a low voltage bus;
a DC/DC converter electrically coupled to the high voltage bus and the low voltage bus;
a second low voltage electric energy storage device selectively coupled to the low voltage bus via an isolation switch and buffered from the low voltage bus via a diode; and
a controller including executable instructions stored in non-transitory memory that cause the controller to adjust an output voltage of the DC/DC converter in response to an engine stop position.

9. The vehicle electric power system of claim 8, further comprising additional executable instructions to increase the output voltage of the DC/DC converter in response to a stopping position of a piston of a cylinder being within a threshold crankshaft angle of top-dead-center compression stroke of the cylinder.

10. The vehicle system of claim 8, where the output voltage of the DC/DC converter is applied to the low voltage bus.

11. The vehicle system of claim 8, where the output voltage is adjusted when an engine is stopped.

12. The vehicle system of claim 8, where the output voltage is adjusted during engine cranking.

13. The vehicle system of claim 8, further comprising additional instructions to crank an engine via a belt integrated starter/generator (BISG) and electric power provided via the low voltage bus.

14. The vehicle system of claim 13, further comprising additional instructions to adjust the output voltage of the DC/DC converter in response to a temperature of the BISG.

15. A vehicle operating method, comprising:
adjusting an output voltage of a DC/DC converter directly coupled to a low voltage bus in response to a temperature of an engine while an engine is not rotating via a controller; and
cranking the engine after adjusting the output voltage of the DC/DC converter via an electric machine, the electric machine directly coupled to the low voltage bus.

16. The method of claim 15, where adjusting the output voltage includes adjusting the output voltage to a first voltage in response to the temperature of the engine being greater than a threshold temperature and adjusting the output voltage to a second voltage in response to the temperature being less than the threshold temperature, first voltage greater than the second voltage.

17. The method of claim 15, further comprising adjusting the output voltage of the DC/DC converter in response to the temperature of the engine while the engine is rotating.

18. The method of claim 17, where the temperature is an engine oil temperature.

19. The method of claim 17, where the temperature is a cylinder head temperature.

20. The method of claim 15, further comprising ceasing to adjust output of the DC/DC converter in response to the temperature of the engine when engine speed is greater than a threshold speed.

* * * * *